United States Patent [19]

Stuckert

[11] 4,277,837

[45] Jul. 7, 1981

[54] PERSONAL PORTABLE TERMINAL FOR FINANCIAL TRANSACTIONS

[75] Inventor: Paul E. Stuckert, Katonah, N.Y.

[73] Assignee: International Business Machines Corporation, Armonk, N.Y.

[21] Appl. No.: 120,225

[22] Filed: Feb. 11, 1980

Related U.S. Application Data

[63] Continuation of Ser. No. 866,197, Dec. 30, 1977.

[51] Int. Cl.³ .............. G06F 15/16; G06K 1/14; G06K 17/00
[52] U.S. Cl. .................. 364/900; 235/379; 235/380; 340/149 A; 364/704
[58] Field of Search .............. 235/379, 380, 375, 384; 340/149 A, 152 R, 365 C; 364/900 MS File, 704, 706, 709, 715, 200 MS File

[56] References Cited

U.S. PATENT DOCUMENTS

| B 289,523 | 1/1975 | Volpe | 340/365 C |
|---|---|---|---|
| 3,437,795 | 4/1969 | Kuljian | 340/365 C |
| 3,544,769 | 12/1970 | Hedin | 235/379 |
| 3,872,438 | 3/1975 | Cuttill et al. | 235/451 |
| 3,906,460 | 9/1975 | Halpern | 340/149 A |
| 3,932,730 | 1/1976 | Ambrosio | 235/61.9 R |
| 3,942,157 | 3/1976 | Azure | 364/900 |
| 3,956,740 | 5/1976 | Jones et al. | 364/900 |
| 4,001,550 | 1/1977 | Schatz | 235/379 |
| 4,007,355 | 2/1977 | Moreno | 235/379 |
| 4,051,605 | 10/1977 | Toal et al. | 364/704 |
| 4,115,870 | 9/1978 | Lowell | 364/709 |
| 4,139,893 | 2/1979 | Poland | 364/706 |

*Primary Examiner*—Gareth D. Shaw
*Assistant Examiner*—Eddie P. Chan
*Attorney, Agent, or Firm*—Roy R. Schlemmer, Jr.

[57] ABSTRACT

A personal portable terminal for financial transactions adapted for use with one or more data storage and transfer cards (DSTCs) and other external devices, such as point of sale terminals, is disclosed. The transaction device includes keyboard means for entering transaction data and control information, means for temporarily storing transaction data, and logic means for performing arithmetic, logical, and control operations. Said logic means further includes means for storing predetermined programs which are activated by instructions entered via said keyboard. Also included are display means for selectively displaying transaction data and means for transferring selected data from the transaction device into suitable storage means located in said other external device and into at least one DSTC. Further means are disclosed whereby account balance data in one DSTC may be credited while account balance data in another DSTC is debited as a result of the transaction.

6 Claims, 11 Drawing Figures

PERSONAL PORTABLE TERMINAL FOR FINANCIAL TRANSACTIONS

This is a continuation of application Ser. No. 866,197, filed Dec. 30, 1977.

BACKGROUND OF THE INVENTION

Modern business practices have to a large extent made the handling of actual cash with the inherent dangers of theft and loss unnecessary in many sectors of our economy. These include banking, large retail stores, and a large variety of other businesses where articles are charged to an account, the individual billed, and the bill subsequently paid by check. In such businesses the actual amounts of money owed and to be credited are kept track of largely through the use of computers which record detailed transaction data, including amounts and the identity of the sellers and purchasers. Banks, credit granting organizations, and large retail stores frequently use computers for the purpose of maintaining customer accounts, debiting and crediting such accounts as the need arises.

However, the individual still must have fairly substantial amounts of cash for making purchases from other individuals, food stores, gasoline stations, and the like. It is believed that there is a long felt need in this area to make the advantages of a "cashless society" available to individuals for small transactions. Such a system, to be practical, would of necessity have to be able to take care of both purchases and sales. Further, in order for such a system to be practical and allow people to have faith in the system, it would be helpful to provide means in such a system to maintain sufficient records of identities of both purchasers and buyers which information would be available in written or in printed form on a regular statement period basis. A further valuable adjunct to such a system would be to allow the use of devices with which everyone is familiar such as, for example, a credit card or credit card-like device for storing the record of the actual transfer of merchandise and credit. Such cards having built-in storage registers and certain rudimentary logic capabilities have been used in the past but are believed to have been largely limited to use with a standard terminal such as a point of sale terminal in a department store, cash issuing terminals, and the like.

In addition to the need for "cashless" transactions it would also be advantageous if such a system could be extended to perform the function of checks and a checking account. In other words, when the credit card-like device was presented to a person in payment for merchandise or services the recording of the transaction by both the seller and purchaser would automatically result in a debit notice or memorandum being placed in the purchasers card and a notice of receipt of the 'promise to pay' placed in the seller's account. At some point in the future when the seller presents the electronically recorded account invoices to a central payee, or bank, it is at this time that the purchaser's account would actually be debited. As will be evident, such a transaction would differ from the above mentioned cash transfer operation in that the actual time of debiting of the purchaser's account would occur at some point in the future.

A further feature which could be incorporated in such a system utilizing a credit card-like device would be a normal credit card function which could be utilized at a wide variety of different stores with all charges going into a central clearing house for charging to a particular account. A number of systems of this nature are currently in wide usage throughout the country.

In addition, the normal large store type of credit account wherein the store has its own credit plan, could also be accommodated within the single credit card-like device.

All of the above desired features of such a system could optimally be contained on a single credit card-like device wherein the customer would indicate the type of account and procedure which he desires to utilize as well as giving his appropriate account numbers or other identifying information.

At this point, in order for such a system to be practical, it should be noted that it would be very desirable to provide a device which would, in effect, interface between the individual's credit card-like device and the various terminal devices which would be present in stores and the like such as, point of sale terminals, cash issuing terminals and the like which would give the individual control over the type of transaction that is ultimately entered into his card. Present business practices, including the use of credit cards in stores, take the credit card out of the individual's possession for a short time, and unauthorized access to certain of the individual's financial data could readily be obtained by such stores during this short time. By suitably designing an interface device it is possible to limit access to the credit card-like device to only a particular account or data designated by the individual. Optimally, the design would also limit access to only certain specified information regarding an account. Thus, such an interface device, if suitably designed could provide the individual with control over his card and the data therein, giving a much higher degree of financial protection to the individual both from inadvertent mistakes and deliberate misuse.

SUMMARY OF THE INVENTION

It has been found that a substantial need in the business and banking community would be satisfied by the provision of individual personal portable terminals which would serve to greatly enhance the concept of a "cashless and checkless society." Individuals would be allowed to perform most banking, financial, and assorted retail transactions by the use of a personal data storage and transfer card (DSTC) which, with the aid of the personal portable terminal, called a "transactor" and abbreviated "XATR," could be used to continually monitor and record an individual's financial records both of a debit and credit nature. Use of the device would allow individuals each having a separate DSTC to consummate a wide variety of transactions. Provision of suitable key input and display capabilities in the device allow transactions to be verified by both parties before the transaction is entered on the DSTCs of the seller and purchaser and similarly, not only the transaction, but also the account numbers of both seller and purchaser may be recorded in each of the DSTCs for later reading out, for example, by a bank data entry terminal at the end of a specified period for audit, fund transfer, and statment printing purposes.

OBJECTS OF THE INVENTION

It is a primary object of the present invention to produce a personal portable terminal device for use with individual data storage and transfer cards (DSTC)

which substantially eliminates the need for cash, checks, or credit cards for most financial transactions.

It is a further object of the invention to provide such a device which is portable, relatively inexpensive, and easy to use.

It is yet another object of the invention to provide such a device which is capable of receiving both the purchaser's and seller's DSTCs and for recording a credit in one DSTC and a debit in the other together with appropriate account identification data.

It is yet another object to provide such a device having a keyboard for entering data into the device which is to be recorded in the individual DSTCs and a display for specifying the transaction data to allow verification of entered data by the parties to the transaction prior to actual entry on the DSTCs.

It is a still further object to provide such a personal portable terminal device wherein the device is self contained, is provided with a resident power source, and would be capable of providing both the data signals and the required power to enter said data into the individual DSTCs via, for example, air coupling.

It is yet another object of the invention to provide such a personal portable terminal device adapted to itself be connected to other devices to facilitate coupling data into and out of individual DSTCs.

It is a still further object to provide a personal portable terminal device wherein any transaction to be entered into an individual's DSTC will be placed upon the display prior to entry and the approval of the owner of the DSTC obtained.

It is yet another object of the invention to provide such a personal portable terminal device, for use with other external devices such as point of sale terminals and cash issuing terminals, which affords the owner of the DSTC and the device a high degree of protection, control, and privacy.

Other objects, features and advantages of the invention will be apparent from the following description of the invention as simplified in the following description and drawings.

DESCRIPTION OF THE PREFERRED EMBODIMENT

The objects of the present invention are accomplished, in general, by a personal portable terminal device operative in conjunction with other devices. The devices includes keyboard means for entering transaction data, and memory means for temporarily storing transaction data, and other selected financial data pertaining to said transaction. Logic means are also contained in said device for performing arithmetic operations on data stored in said memory means and data entered via said keyboard means. Display means are provided for selectively displaying data including but not limited to said transaction. Means are also provided for receiving one or more DSTCs in the device and for entering transaction data from said device into said DSTCs. Further means are included within said device for selectively crediting the account balance stored in one DSTC and for debiting the account balance stored in the other DSTC.

In addition to being adapted to receive one or more DSTCs the device is further adapted to be connected to other external devices of the same type and also larger more sophisticated devices such as a point of sale terminal in a retail establishment or a data entry terminal whereby material stored on a DSTC may be entered into a central computing system via the XATR.

Before proceeding with the detailed description of the disclosed preferred embodiment some general description of the overall use and function of the device will follow together with a general description of other possible features which could be included in such a device but which are not specifically disclosed or claimed herein.

The present personal portable terminal device or XATR would normally, although not necessarily, be owned by the owner or holder of an individual DSTC. In the following description it will be assumed that when the same person owns a XATR and a DSTC that this DSTC is referred as the "native" DSTC when placed in the XATR. A DSTC which is the property of another person and which may be temporarily housed in someone else's XATR for purposes of data transfer is hereafter referred to as "visiting" DSTC.

In addition to coupling with one or more DSTCs the XATR is configured to be plugged into or otherwise placed in a cooperative data exchange relationship with a number of other devices. Among these possibilities are the ability to be connected with another similar XATR and its associated native DSTC. It could, additionally, provide an interface between its own native DSTC and a point of sale terminal, a point of collection terminal, a data entry terminal, or various types of identity authentication devices.

The XATR, its native DSTC, and all other devices disclosed or suggested herein are intended primarily to facilitate the execution of financial transactions in the absence of currency or checks. Secondarily, the XATR and its native DSTC may provide other data entry, storage retrieval, and computational or display functions which are useful to the owner.

In general, operation of a XATR involves a transfer of information such as digital data bytes and/or control bytes between the XATR and one or more devices in communication therewith in both directions. All such information transfers are communicated through the same medium (air in the disclosed embodiment) over distances which may range from a maximum of say 0.25 inches to a minimum of several thousands of an inch. As is well known in the communications art, such communication may either be full duplex or half duplex. Either mode could be employed in the information transfers between a XATR and another devices. For purposes of the present description full duplex operation is assumed.

It will, of course, also be apparent that the particular mode of communication between a XATR and other devices could take on a number of other forms, the most obvious of which would be direct electrical contacts. However, it is to be noted that a system utilizing such contacts would be subject to wear and a number of other obvious disadvantages. It is accordingly assumed that capacitative air coupling would be utilized in such a system.

In full duplex transmission through a common medium, separation of the two signals which are propagating in opposite directions may be accomplished by spatial division, frequency division, or with hybrid circuits (i.e. directional couplers). Any of these modes could be employed in the information transfer between a XATR and another device. For purposes of the present description spatial division will be assumed.

In full duplex spatially divided transmission through a common medium, coupling may be inductive, capacitive, modulated radio frequency, or some combination thereof. Any of these coupling means could be employed in the information transfers between a XATR and another device. For the purposes of the present description, capacitive coupling of modulated radio frequency signals will be assumed.

Further, for purposes of description, information transfers are assumed to be serial by byte and serial by bit.

In general, operation of a XATR involves a transfer of power from the XATR to one or two DSTCs. This power is necessary to allow the transfer of data to and from the storage circuitry resident within such a DSTC. In addition, operation of a XATR in conjunction with other devices could possibly involve the transfer of power from such other devices to the XATR.

Figure 1:
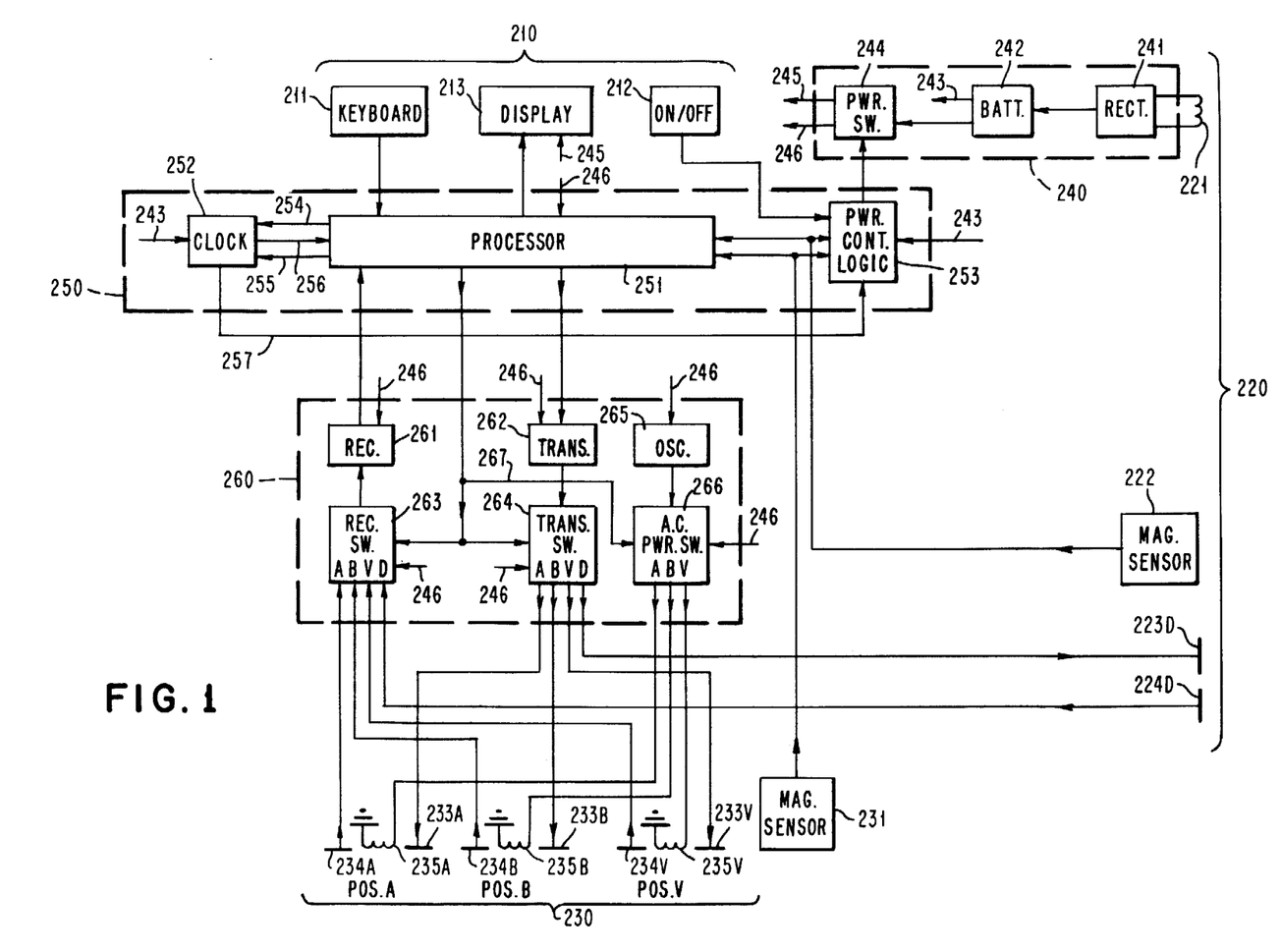
FIG. 1 comprises a functional block diagram of the circuitry contained in a preferred embodiment of a XATR constructed in accordance with the teachings of the present invention.

For all such power transfer operations, inductive coupling of an a.c. signal is assumed. Referring now specifically to FIG. 1, there is shown a functional block diagram of the electrical and electronic circuitry of a preferred embodiment of a XATR constructed in accordance with the teachings of the present invention. In the figure, the bracket 210 implies the interface to the owner or operator of the XATR. The bracket 220 indicates the interface between an individual XATR and some other device such as, for example, another XATR, a point of sale terminal, point of collection terminal, data entry terminal, or simply a charging station. Bracket 230 indicates an interface between the XATR and one or more DSTCs.

The input and output means of the XATR available to the operator or owner are the keyboard 211, the display 213 and the on/off switch 212. The display 213 would conventionally be alphanumeric in character and would be capable of indicating such items as the type of transaction, the amount of the transaction, and other information pertinent to the transaction.

The following elements are located along the XATR to XATR (or other device) interface 220. A transformer winding 221 is shown for supplying charging power to the local battery when such charging is required. A magnetic field sensor 222 is shown which detects the field of a magnet located in another associated device. This sensor is preferably a magneto resistive device, a permanent magnet actuated reed relay, or some other device for indicating to the XATR that the XATR is in a data and/or power transfer relationship with another external device and that certain predetermined operational sequences are now possible. 223D and 224D are capacitor plates for transmitting data from and to the XATR respectively, and would operate in combination with similarly disposed plates on the matching devices to which the XATR is adapted for coupling. As stated previously, it is assumed that the actual data and control signals are transmitted via modulated radio frequency signals between the devices.

As will be described subsequently, the native DSTC associated with a particular XATR typically interfaces to the XATR when it is in a first position, hereinafter referred to as position "B." In addition, when a visiting DSTC is associated with a particular XATR, the native DSTC is moved to a second position referred to herein as position "A." The visiting DSTC occupies a position referred to herein as position "V." Thus, three interface positions are indicated along interface bracket 230, as positions "A," "B" and "V." It will be noted that each position comprises two communication paths (capacitor plates) and a power link (transformer windings).

233A, 233B, and 233V, are capacitor plates which in combination with similar capacitor plates located in the individual DSTCs, provide information transmission paths for modulated radio frequency signals from the XATR to the DSTCs.

234A, 234B and 234V, are capacitor plates which in combination with similar capacitor plates located in the individual DSTCs, provide information transmission paths for modulated radio frequency signals from the DSTCs to the XATR.

The transformer primary windings 235A, 235B, and 235V, cooperate with similar secondary windings in the DSTCs to provide power transmission paths from the XATR to the DSTCs to perform the necessary operations referred to previously.

The device 231 is a magnetic field sensor like the device 222 described previously which indicates to the XATR that its native DSTC is located in position A.

D.C. power for the operation of the XATR is provided by those devices located within the dotted block 240. The power devices include a rectifier 241 whose input is the secondary winding 221 and whose output is connected to a rechargeable battery 242. Rectifier 241 could also contain circuitry to prevent overcharging of the battery 242 and protective circuitry to prevent damage to the elements within block 240 in the event of the application of an improper excitation to the winding 221. The battery 242 is shown as having one output 243 which is connected to all circuits in the XATR which must be continuously energized.

Block 244 contains various power control switches, which selectively and in response to signals from the power control logic 253 apply power to various circuits. Typically 244 has more than one output, as shown, wherein output 245 energizes the display 213 and output 246 energizes all other circuitry within the XATR. Outputs 243, 245 and 246 are labeled in the disclosed circuitry as appropriate.

The digital circuits of the XATR lie within the dotted block 250. In this block the digital processor 251 is shown whose major functions are control, message formatting, message routing, checking, addition, subtraction, and input/output operations. Other than the read only stored required for its own control routines and the routines which it executes in the various modes of operation and the temporary data storage required for the execution of such routines, the processor contains no storage. Thus, in the presently disclosed embodiment, the processor contains no storage for financial transaction data.

A digital real time clock 252 is provided which keeps time in seconds, minutes, hours, days, months and the last two digits of the year. It also contains counters for the implementation of the timing functions of the XATR.

Power control logic block 253 operates in response to signals from the on/off switch 212 and the magnetic sensors 222 and 231, to energize or deenergize the appropriate circuits. It also deenergizes appropriate circuits in response to time out signals from the digital clock 252. Line 254 is a signal path which indicates processor activity and resets the time out counters in the digital clock. Line 255 is the signal path for setting the digital clock. Line 256 denotes the signal paths over which clock signals and real time information are delivered to the processor and line 257 comprises the signal path over which time out signals are delivered to power control logic 253.

The analog and hybrid circuits of the XATR lie within the dotted block 260. Within the block 261 is a rudimentary receiver which converts received modulated radio frequency input to digital output. Element 262 is a rudimentary transmitter which converts a digital input to modulated radio frequency output. Element 263 is an analog switch which routes radio frequency signals from a selected input to the receiver. Element 264 is an analog switch which routes radio frequency signals from the transmitter to a selected output. Element 265 is an oscillator connected to the a.c. power switch 266 which in turn routes a.c. power for delivery to the DSTCs via selected transformer primaries 235A, 235B, or 235V. It should be noted that the analog switches 263, 264, and 266 are controlled by a common input 267. 233D, 234D, and 235i or 223i and 224i are all activated simultaneously, where i equals A, B, or V. It will be remembered from the above description that 'A,' 'B,' and 'V' correspond to various positions of one or two DSTCs located within the receiving slot of a XATR and that position 'D' corresponds to a XATR connected to another external device other than a DSTC as described above.

Figures 2A, 2B, 2D:
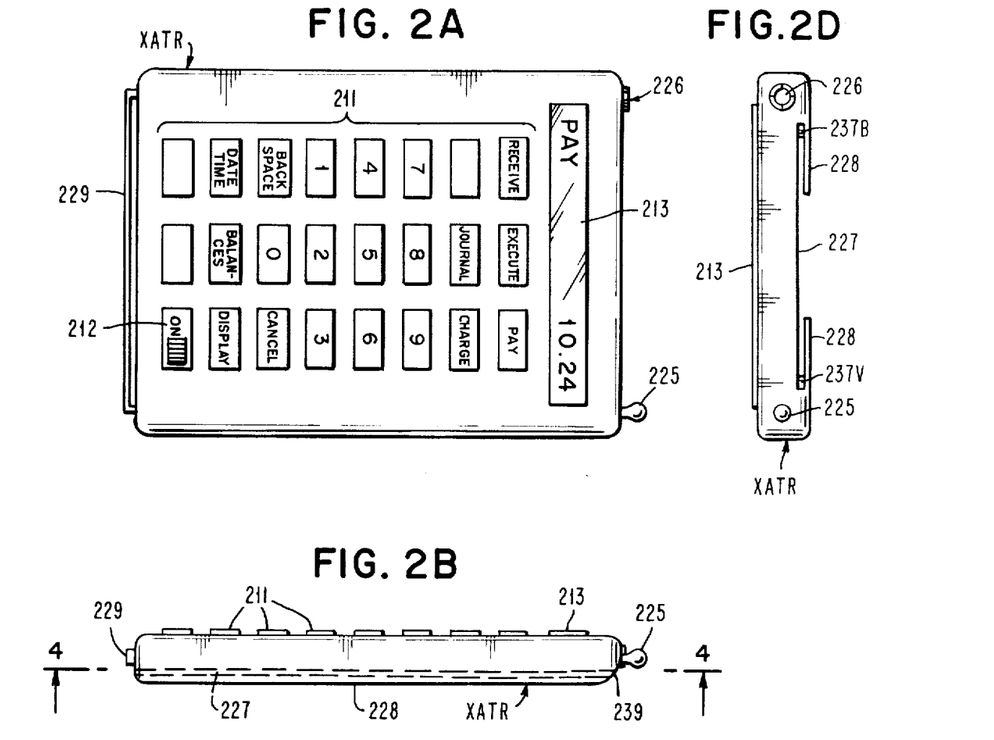
FIGS. 2A, 2B, 2C and 2D comprise top, side, bottom, and front views respectively of such a XATR.
Figure 2C:
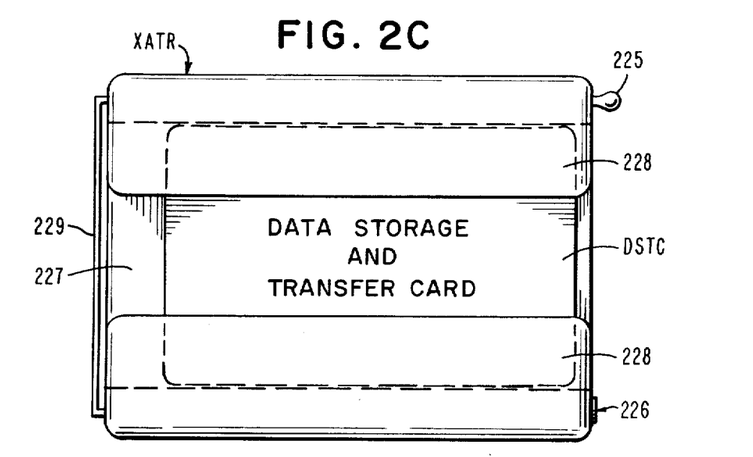

Referring now to FIG. 2, the overall geometry of a typical XATR is shown. FIGS. 2A, B, C and D are top, side, bottom and front views respectively of the XATR specifically shown and described in block form in FIG. 1. It should be noted that the same reference numerals are utilized throughout the present description and drawings to identify the same elements. Referring to FIG. 2A the top surface of the XATR essentially corresponds to the operator interface bracket 210 as shown in FIG. 1. On the top surface are located the keyboard 211, ON/OFF switch 212, and the alphanumeric display 213.

The front surface of the XATR is depicted in FIG. 2D and corresponds to the bracket 220 in FIG. 1. The electrical components mounted along this surface are shown in FIG. 1 and their function will be described later. However, in addition to these components, a male aligning and fastening pin 225 is shown, which, with modest force is designed to snap into or out of a complementary female aligning and fastening hole or plug similar to 226 in another XATR, point of sale terminal, data entry terminal, or the like. Conversely, plug or hole 226 is a spring loaded female aligning and fastening structure which with modest force snaps or unsnaps around a complementary male aligning and fastening structure in another XATR, point of sale terminal, data entry terminal, or the like. Thus, elements 225 and 226 are exemplary of any one of many possible complementary mechanical mating structures. Their functions is to physically align and attach devices and, as disclosed, do not form any part of the control or data transfer function. The side view of the XATR shown in FIG. 2B shows the configuration of the male member 225 and also of a simple retention bail 229 (also shown in FIGS. 2A and 2C) which may be provided to allow for the physical attachment to the XATR into a wallet or some other form of relatively high security holding device. Also shown in FIG. 2B at the bottom are two dotted lines which define a slot formed by the overlying tabs 228 for receiving the DSTCs.

The bottom surface of the XATR shown in FIG. 2C corresponds to the DSTC interface bracket 230 of FIG. 1. The actual operation of the components mounted along this surface will be described in further detail later. A slot 227 is defined in the bottom of the XATR whose width is shown by the dotted lines in FIG. 2C and its thickness is defined by the dotted lines in FIG. 2B. The slot for retaining a DSTCs is formed preferably by two overhanging tabs 228 which may preferably be made of metal or some other suitable material which contains a continuous conducting screen or sheet. The purpose for such a shield would be to prevent unauthorized eavesdropping on transactions as will be understood. Also, as will be described in detail later, the DSTC may be moved to the various positions A, B, and V within the slot 227 by means of thumb or finger pressure applied through the open space between the tabs 228. In FIG. 2C a DSTC is illustrated in position B.

Figure 3:
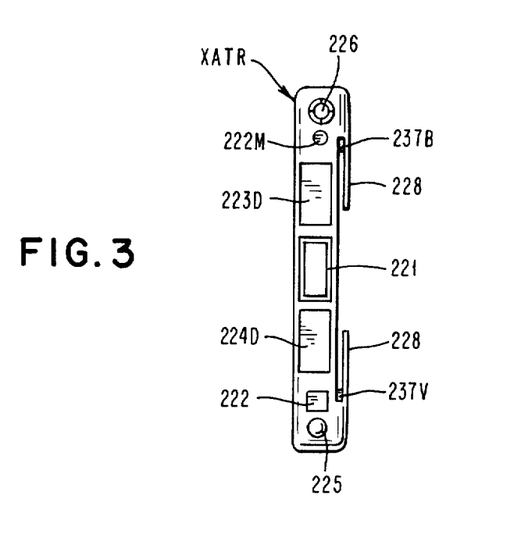
FIG. 3 comprises a front view of such a XATR showing the location of certain circuit elements mounted in the front surface thereof.

Referring now to FIG. 3, there is shown a front view of a XATR showing previously identified components 225 and 226 and components described in connection with above description of FIG. 1. These components may be mounted flush with the surface, but, for protection and for appearance are preferably mounted a short distance below the surface under an appropriate covering material which will not interfere with data transfer or power between devices. These surface components are a multi turn transformer secondary winding 221 which may be fitted with a partial ferromagnetic core, a magnetic sensor element 222, the input and output capacitor plates 224 and 223 and a permanent magnet 222M which activates a magnetic sensor, such as 222 described above, for use when the XATR is mated with another XATR or other external device having a sensing element similar to element 222.

Figure 4:
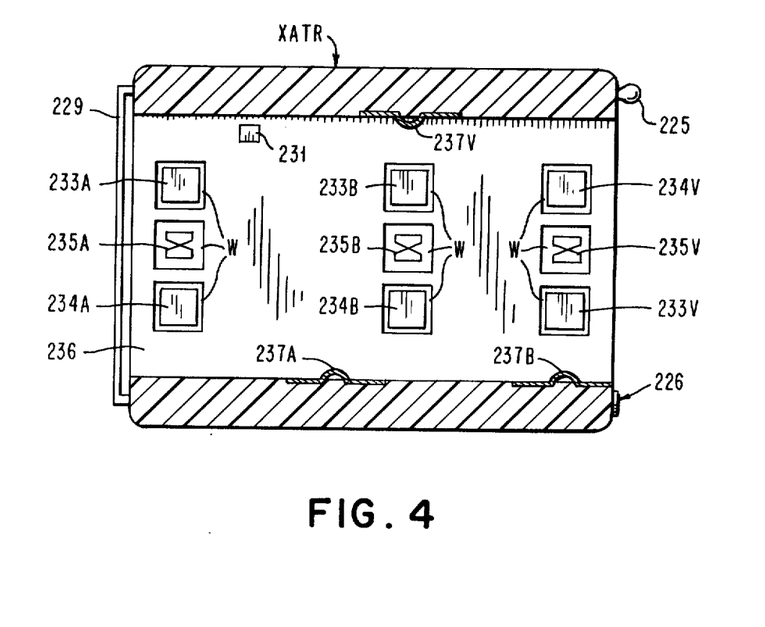
FIG. 4 comprises a bottom view, partly in cross section, illustrating the placement of certain information transfer and power transfer components within the bottom surface of a XATR.

FIG. 4 is a bottom view of a XATR along section line 4—4 of FIG. 2B showing components described in connection with the DSTC interface 230 of FIG. 1. These components may be mounted flush with the surface, but, for protection and for appearance are preferably mounted a short distance below the surface under a suitable protective material. These components are the magnetic field sensor 231, the output capacitor plates 233A, 233B, and 233V, the input capacitor plates 234A, 234B, and 234V, and the transformer primary windings 235A, 235B, and 235V which may also be fitted with partial ferromagnetic cores.

According to a preferred embodiment of the invention there is a continuous electrically conductive surface 236 which covers the entire bottom surface of the XATR with the exception of regions or windows W around the components 233i, 234i and 235i. The surface or film 236 is a ground reference plane and also functions as a radio frequency shield for security purposes. Further, as mentioned previously, the shield located within the tabs 228 may be connected to the shield 236 to extend both ground plane and the radio frequency shielding effect. members 237A, 237B and 237V are flat spring members having semicircular locators which extend into the DSTC slot 237 in the bottom of the XATR. These semicircular positioning members engage corresponding notches in the sides of the individual DSTCs to retain and properly position the DSTCs in the slot in one of the three positions, A, B, or V.

Before describing the cooperative operation of a XATR and a DSTC it is necessary to briefly set forth the components and operations of a typical DSTC having a structure complementary to that of the herein disclosed XATR. It is however, not intended that the DSTC be patentable per se and the following brief description of FIG. 5 is intended merely to set forth a suitable arrangement of components for coupling with the herein disclosed and claimed XATR.

Figure 5:
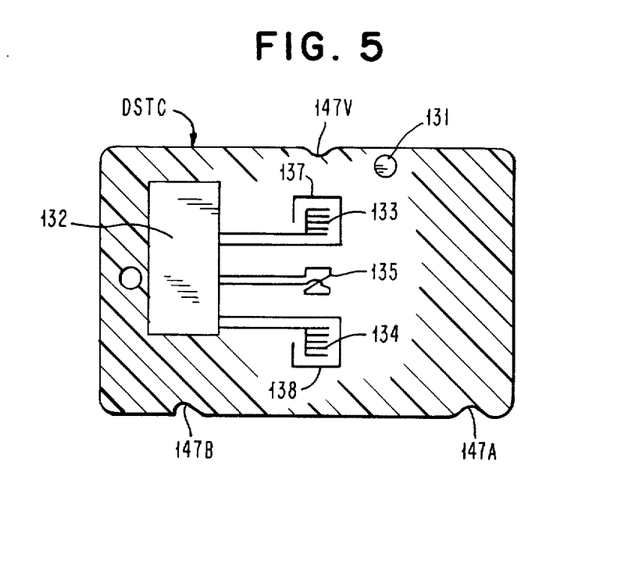
FIG. 5 shows details of a typical DSTC suitable for use with the XATR of the present invention.

FIG. 5 is a center sectional view of a typical DSTC showing the components associated with the operation of the DSTC in the course of a typical financial transaction or other data retrieval/storage operation. Shown in the figure is the permanent magnet insert 131 which cooperates with the sensor 231 in the XATR to indicate that there is a DSTC present in the slot 237. Element 132 depicts the electronic circuitry of the DSTC which may include a rectifier connected to secondary winding 135, a receiver connected to element 133, a transmitter connected to element 134, various digital control circuits and digital storage elements. In response to commands from a XATR the DSTC either stores data received from the XATR or transmits data stored within the DSTC to the XATR. Element 133 is a capacitor plate which, in combination with similar plates (i.e. 233i) in a XATR, comprises an information receiving path for modulated radio frequency signals from the XATR. Element 134 is a capacitor plate which, in combination with similar capacitor plates (i.e. 234i) in the XATR, comprises an information transmitting path for modulated radio frequency signals from the DSTC. Element 135 is a transformer secondary winding which, in combination with similar primary windings (i.e. 235i) in a XATR, provides a power transmission path from the XATR to the DSTC. Elements 137 and 138 are conductors which are connected to the ground of the DSTC circuitry and which are associated with elements 133 and 134 respectively.

Notches 147A, 147B and 147V are also shown in FIG. 5 and are for the purposes of positioning a DSTCs in one of the three positions A, B, or V. It will be noted that both the sides of the notches 147A and 147V are rounded while only the right side of notch 147B is rounded. The function of the notch contours will be described later.

It should be noted at this point that conventionally on such a DSTC various types of identity or authentication information could be provided so that the authenticity of the holder of a particular DSTC might be verified in some manner, such as by comparing a stored number with a key entered number with or without cryptographic complexity added to a translation and comparison routine. Alternatively some relatively simple physical descriptive material could be stored in the DSTC which would be susceptible of display on a XATR. However, the details of the circuitry for performing such identifying operations are not considered a part of this invention and accordingly are not specifically disclosed herein.

There will now follow a description of various cooperative operations between a XATR and one or more DSTCs. As stated above, identity verification or user authorization routines are not considered part of this invention and accordingly only financial transaction operation will be described.

Figure 6:
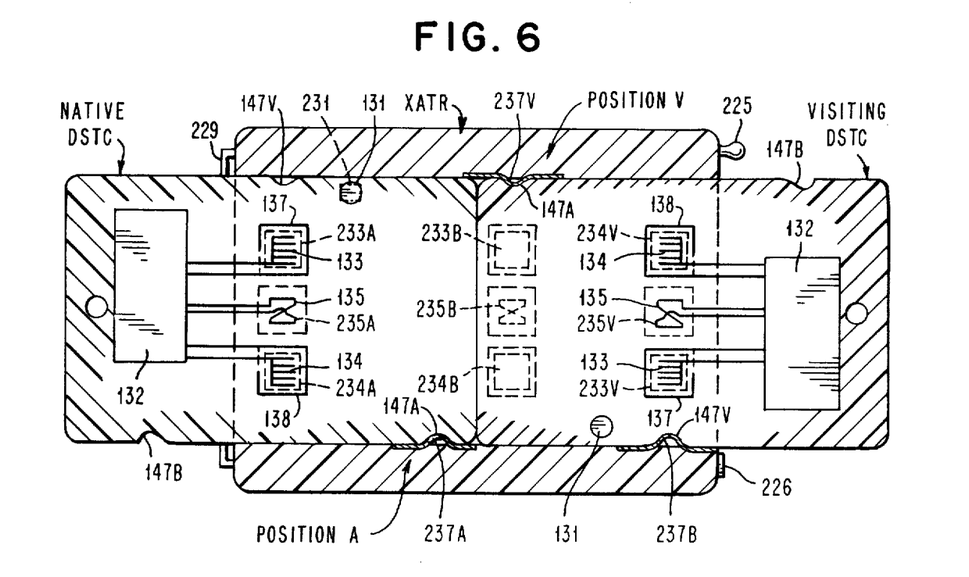
FIG. 6 is a bottom view, partly in cross section, of a XATR showing two DSTCs in place therein and in data transfer relationship therewith.

As set forth previously, the postioning of the DSTC in various locations, i.e., positions A, B, or V, have been generally referred to especially with reference to FIGS. 4 and 5. FIG. 6 shows a composite view of the XATR with both a native and visiting DSTC in positions A and V, respectively. It will be noted that the figure shows the two DSTCs as abutting at one end, however, this would not be necessary. Referring to FIG. 6, it will be noted that the visiting DSTC is mechanically located and held in position by springs 237V and 237B and that its input/ouput interface elements 133, 134 and 135 are mechanically aligned with elements 233V, 234V, and 235V, respectively, in the XATR. It will further be noted that the native DSTC is mechanically located and held in position by spring 237A and that its input/output interface elements 133, 134 and 135 are mechanically aligned with elements 233A, 234, and 235A, respectively, in the XATR. It will be further noted that the magnetic insert 131 on the native DSTC is mechanically aligned with the magnetic sensing element 231 of the XATR.

Figure 7:
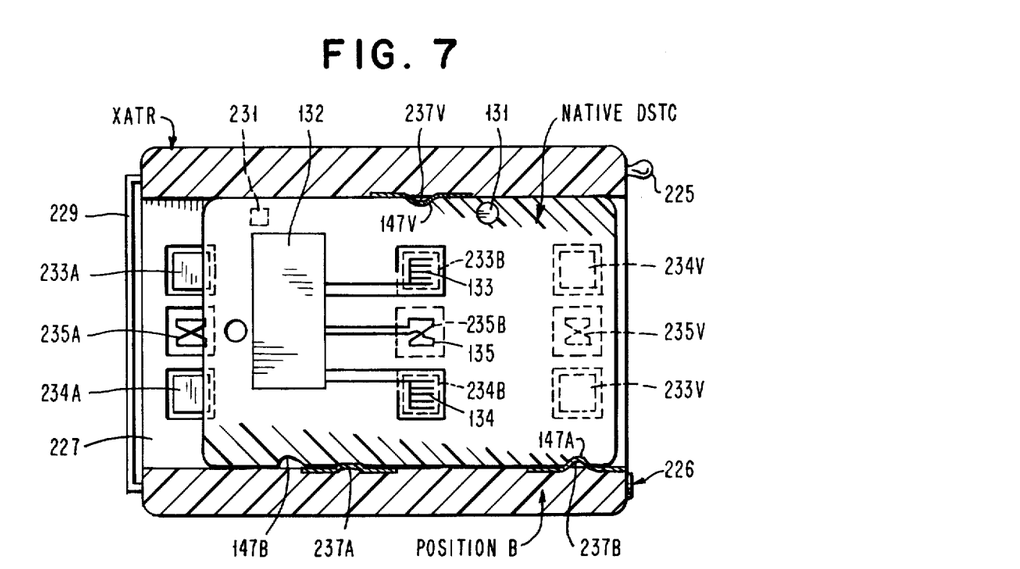
FIG. 7 is a bottom view, partly in cross section, of a XATR showing a single DSTC in place therein and in data transfer relationship therewith.

FIG. 7 shows a native DSTC in position B. It will be noted that the DSTC is mechanically located and held in position by springs 237B and 237V. And that its input/output interface elements 133, 134 and 135 are mechanically aligned with the elements 233B, 234B and 235B, respectively, in the XATR and that the DSTC is totally housed within the XATR slot 237.

Figure 8:
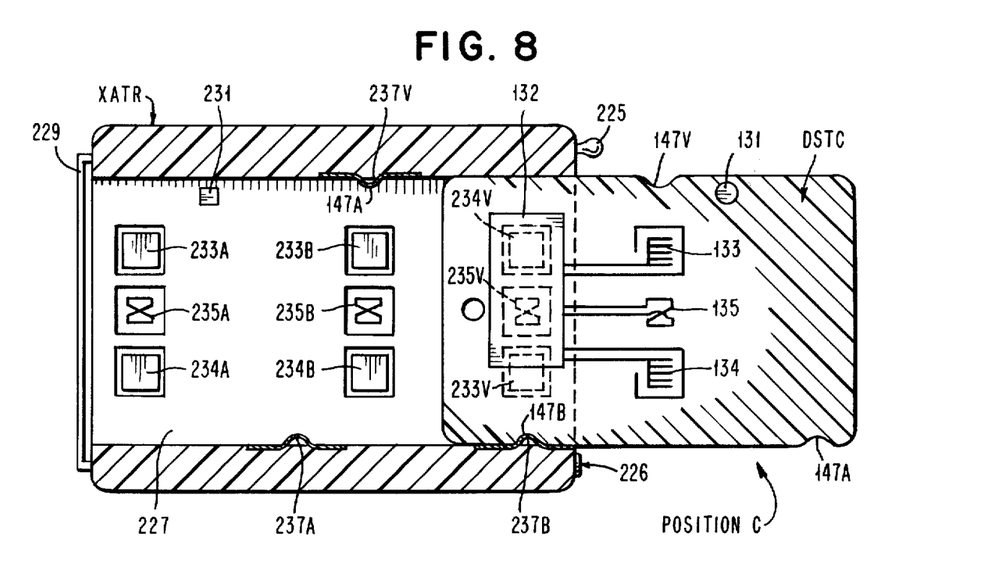
FIG. 8 is a bottom view, partly in cross section, of a personal portable terminal showing an individual DSTC in a second position such that different operations are possible than when the DSTC is located as illustrated in FIG. 7.

FIG. 8 shows the DSTC in position C. It will be noted at this time the DSTC is mechanically located and held in position by the spring 237B and that its input/output interface elements 133, 134 and 135 are outside the transactor. In moving the DSTC from position B to position C there is a danger that the DSTC might be pushed completely out of the XATR, dropped, and possibly lost. This danger is eliminated by the cooperative action of spring 237B and the special contour of notch 147B. From a very brief description of FIGS. 6, 7 and 8 it is obvious that a native DSTC can be inserted in the XATR slot from either end but that it can be removed from the XATR only by moving it to the left.

Having described the physical location of both the native and visiting DSTCs in the various positions A, B, V, and C there will now follow a description of typical financial transfers between two DSTCs. Both DSTCs may function as debit cards or the operation may be the equivalent of writing a check. In the course of executing financial transactions, one XATR, in response to keyboard entries, always forms a transaction message. This message preferably contains the following items:

1. The unique identifying number of the native DSTC.
2. The unique identifying number of the visiting DSTC.
3. The date (month, day, and at least two digits of the year) and the time (hour, minute, and second).
4. The direction of the transfer, i.e., whether the native DSTC is to receive a debit or a credit.
5. The amount of transaction in a specified currency.
6. An indication of whether the details of the transaction are to be "journaled" or not, i.e., whether a central reconciling and recording system shall prepare a hard copy record of the transaction for subsequent delivery to both parties to the transaction. Such an operation per se is obvious to those skilled in the art and does not form a part of the present invention. The only reference to this operation is a bit or bits which indicate that "journaling" is required.

The physical description of positions A and V have been previously described. This position is used in the execution of financial transactions between the owner of the XATR and its native DSTC and the owner of a visiting DSTC who does not own or have an operating XATR. In this mode of operation the DSTC's are positioned in the XATR as shown in FIG. 6 to align the cooperative power and information transfer elements. One of the parties to the transaction, performs the following operations on the keyboard of the XATR. First the ON/OFF switch is turned to the ON position. This causes the XATR circuitry to be turned on and the appropriate switching to be performed to establish the appropriate power and communication paths between itself and both DSTCs. Both DSTCs are now powered. Referring to the keyboard configuration of FIG. 2A the PAY (or RECEIVE) key is depressed. The alphanumeric display would then read "PAY" (or "RECEIVE"). It will be noted that in the presently disclosed system the operations PAY, CHARGE, and RECEIVE are relative to the native DSTC. Next appropriate keys 1, 0, 2, and 4 are depressed in sequence to indicate that $10.24 is to be credited to the visiting DSTC and debited from the native DSTC. The display 213 should now read "PAY 10.24." At this point the JOURNAL key could be depressed, and cause a "J" to appear on the display. Now both parties to the transaction inspect the display to confirm that the transaction indicated is correct in all respects. Agreement having been reached, the operator depresses the EXECUTE key and the XATR performs the following operations.

1. Read the date and time from its clock.
2. Read the identifying number of its native DSTC.
3. Read the identifying number of the visiting DSTC.
4. Read the balance in its native DSTC.
5. Read the balance in the visiting DSTC.
6. If a PAY operation is indicated, determine that the balance in the native DSTC is greater than the amount indicated. If a RECEIVE operation is indicated, determine if the balance in the visiting DSTC is greater than the amount indicated.
7. Form the transaction message.
8. Compute the new balances for both DSTC's.
9. Store in the visiting DSTC the transaction message and the new balance.
10. Store in the native DSTC the transaction message and the new balance.

The transaction is now complete, the visiting DSTC is removed from the XATR, the native DSTC is returned to position B and the XATR is turned off.

There will now be described the operations which would occur when the native DSTC is in position B. The physical configuration of position B has been described and illustrated previously with respect to FIG. 7. This position is used in the execution of transactions between two owners of XATR's each with its own native DSTC or between an owner of a XATR with its native DSTC and another device such as a point of sale terminal, bank terminal, or the like. It should be noted that functionally such other devices are identical in operation to a XATR with its native DSTC. For simplicity of description, operation involving two XATRs is described below. In this mode of operation the two XATRs are coupled together, front-to-front, as described previously with respect to FIG. 2D with the mating members 225 and 226 interconnected. Such coupling action causes the magnetic sensor 222 in each XATR to be activated by the corresponding magnetic insert 222M in the other XATR and thus causes both XATRs to be turned on and the necessary communication link between the XATRs to be established. Either person may initiate operation by depressing either the PAY or RECEIVE key on his own transactor and the person initiating the action, for the time being, seizes control of both XATRs and the communication link between them. The control XATR display now reads, "PAY" (or "RECEIVE") and the slave XATR display reads its complement.

The person with the control XATR continues with the following operations. (It is assumed that the ON/OFF switch for both XATR's was placed in the ON position prior to their interconnection). The appropriate numeric keys are depressed in sequence to indicate that $10.24 is to be transferred in the appropriate direction. The control XATR display now reads "PAY (or RECEIVE) 10.24" and the slave XATR now reads "RECEIVE (or PAY) 10.24." The control XATR now relinquishes control. Typically at this point both parties to the transaction inspect their displays to confirm that the action indicated is correct and acceptable. Optionally, either party may depress his JOURNAL key. If either JOURNAL key is depressed J appears in both displays after the transaction designation. No further action occurs until both parties to the transaction depress the EXECUTE keys on their respective XATRs. When the second EXECUTE key has been depressed, the XATR containing same seizes control and the ten operations enumerated above with respect to positions A and V occur. As will be appreciated, these operations result in the complete transaction data being recorded on both DSTCs. The transaction is now complete and the XATRs are disconnected and turned off.

The purpose of the XATR with its native DSTC in position C will now be briefly described. Position C was described with respect to FIG. 8 previously. It should be understood that when the DSTC is in position C, the XATR does not in any way function in the financial transaction, and that it is in effect merely a physical handle for the DSTC. Thus, none of the circuit elements in the XATR need line up with cooperating elements in the DSTC. The position is used when the owner of the XATR and its native DSTC may: (1) because of the small amount of money involved, (2) a desire to save time, (3) has sufficient faith in the other party to the transaction, or any combination thereof, desires to have a PAY operation executed solely by the receiving party's equipment without his own XATR exercising any control over or participating in the transaction. In this mode of operation, the extended DSTC is placed in (or passed through) a slot or placed in an appropriate position on a surface in the receiving device which is fitted with elements which are the same as 233V, 234V and 235V in FIG. 4. The receiving party's equipment performs operations which are functionally identical to those described for position V, above, for a visiting DSTC. In fact, in position C a DSTC while still partially in its own XATR may be a visiting DSTC in another XATR, it being clearly understood that when in this configuration its own XATR is still merely functioning as a handle.

The above description of the operation of the presently disclosed preferred embodiment of a XATR with various combinations of DSTCs, other XATRs, and other devices complete the description of the essential features of the herein disclosed transactor which are considered to fall within the general spirit and scope of the present invention. However, for the sake of completeness and for the further reason of setting forth the wide variety of possible uses which could readily be found for the XATR/DSTC combinations, the following brief description of a number of other possible uses is included herein.

A XATR with its native DSTC in either position B or position C or a DSTC in the absence of a XATR may, in certain combinations, interact with any of a number of other devices as referred to briefly previously. As indicated previously, a XATR with its native DSTC in postion B may readily interact with a point of sale terminal in a manner essentially identical to the operation between two XATRs each with its native DSTC in position B, insofar as the information recorded in DSTC and the operation of XATR is concerned. The following differences would of course be present.

A point of sale terminal would, typically, be physically larger than a XATR and it would be powered by the local line voltage, rather than by a battery. It would also, typically, be fitted with an a.c. transformer primary winding, similar to the secondary winding 221, as shown in FIG. 3 to deliver battery recharging power to the XATR in the course of the transaction.

A XATR with its native DSTC in position C could also interact conveniently with certain point of collection terminals. The operation would be the same as that described above for the operation in position C. This mode of operation or use would be where the financial amounts were quite small to the point where specific journaling and record keeping would hardly be justified in addition to the fact that people with whom one would be dealing would be hardly likely to be dishonest. The situations anticipated for this type of operation might be in connection with the payment of highway and bridge tolls, subway fares, street car and bus fares and possibly the payment of telephone charges, etc.

One final interaction between a XATR and its native DSTC which should be touched on is the interaction with a data entry terminal. Since the storage space in a DSTC will be limited and all transactions must, eventually, be reconciled by some central system, means for transferring the information in a DSTC to the central system is needed. Some form of data entry terminal would obviously provide this function.

Although no specific data entry terminal is anticipated, it is possible that it would be some form of a communication device, typically a telephone, which is fitted with elements which are complementary to the XATR elements shown in FIG. 3. When the XATR with its native DSTC is connected to the data entry terminal, the data entry terminal reads the transaction messages and transfers them to the central system, assuming of course that a prior communication channel has been set up and a "ready to receive" signal of some sort has been received, at which point a "begin data entry" button or some similar button is pressed which causes the complete contents of the storage area of the DSTC to be read into said central system. The storage area of the DSTC is then erased and/or appropriately updated to ready it for future use. During this operation the data entry terminal could also be equipped to provide battery recharging power to the XATR as described above.

An alternate form of data entry terminal could obviously have a slot for a DSTC alone so that the operation described above may be performed in the absence of a XATR. However, such a configuration would have the advantage of protection, control, and privacy of the DSTC afforded by the transaction as described previously.

As briefly alluded to previously, the DSTC device might readily be provided with some sort of identity verifying codes, numbers, etc., which could be utilized in a number of different ways for verifying the identity of the card holder. However, it is not believed that such identity verification forms a part of this invention and accordingly such details are not included.

CONCLUSIONS

From the above description of the presently disclosed and described Personal Portable Terminal or Transactor, it may readily be appreciated that a wide variety of functions may be built into such an overall system depending upon just how much circuitry and program storage is provided in the XATR and, similarly, how much storage capacity, etc., is included in the DSTC. Thus, as stated previously, a single DSTC could be provided with cash accounts, the equivalent of checking accounts, a wide application charge account, and a number of individual large store accounts. All of these would be identified by special account numbers and would automatically give access to certain data in the DSTC relating to these accounts. By utilizing the terminal device as an interface between the individual's DSTC and the point of sale terminal etc., the individual will know at all times the details of every operation going on within his DSTC including the particular account number being accessed, as well as the transaction amount and the nature of the transaction. Further, by the provision of an appropriate entry key, entry of an incorrect transaction may be prevented as well as access to unauthorized accounts. Thus, the individual has a high degree of control over just what goes on relative to his accounts. Such control is not generally available in most present systems. This control obviously provides the individual with protection against both accidental and intentional transaction errors being recorded in a particular account and also prevents unauthorized access by, for example, another person, a store, or a bank, into account data which the individual may not wish to be revealed. As will further be apparent, other more sophisticated control functions could be built into the XATR and the DSTC utilizing the basic concepts disclosed and described herein.

It will be apparent that the herein disclosed embodiment of a XATR is capable of many modifications and changes by those skilled in art. However, it is believed that the concept of such a personal terminal device which can perform certain transactions utilizing a native and a visiting DSTC either with or without a second transactor or other device is broadly novel. Thus while the invention has been specifically shown and described with reference to the herein disclosed embodiment, it will be appreciated many changes could be made by persons skilled in the art without departing from the spirit and scope of the invention as set forth in the specification and claims.

What is claimed is:

1. A substantially wallet-sized personal portable hand held terminal device (XATR) including keyboard means for entering transaction data, memory means for at least temporarily storing transaction data and other selected data logic means for performing arithmetic operations on data stored in said memory means and data entered via said keyboard means, display means for selectively displaying data to the operator of said terminal device (XATR), control means for causing predetermined operations to be performed by said terminal device (XATR), means for receiving at least one data storage and transfer card (DSTC) in said terminal device (XATR), receiving and transmitting means located in said terminal device (XATR) for coupling with complementary data receiving an transmitting means in said data storage and transfer card (DSTC) for transferring data between said terminal device (XATR) and said data storage and transfer card (DSTC), means in said terminal device (XATR) for preventing the transfer of data to or from a said contained data storage and transfer card (DSTC) until actuated by the operator of said terminal device (XATR), fixed means for directly connecting said terminal device (XATR) to external devices, said external devices including receiving and transmitting means for transferring data between said external devices and said data storage and transfer card (DSTC) contained in said terminal device (XATR), whereby said terminal device (XATR) effectively functions as a controllable interface device between said at least one contained data storage and transfer card (DSTC) and said external devices, means responsive to the recognition of said external device as being a second substantially wallet-sized personal portable hand held terminal device (XATR), for concurrently entering data in said data storage and transfer card (DSTC) located in said first terminal device (XATR) and a data storage and transfer card (DSTC) located in said second connected terminal device (XATR), said last named means being responsive to the approval by both operators of said terminal device (XATRs) for entering data in said both data storage and transfer card (DSTCs) after the data is first displayed on said display means which approval is signified by said operators deactivating said means for preventing in said both terminal devices (XATRs).

2. A personal portable hand held terminal device (XATR) as set forth in claim 1 wherein the respective data receiving and transmitting means located in said terminal device (XATR) comprises radio frequency capacitor plates located in the surface of said terminal device (XATR) adjacent to the positions where said data storage and transfer card (DSTC) and said external device is to be located for air coupling, each said receiving means including means for demodulating a received modulated radio frequency signal and each said transmitting means including means for modulating data information which is to be transmitted upon a radio frequency carrier.

3. A personal portable hand held terminal device (XATR) as set forth in claim 2 including means for air coupling alternating current power between said device and said external device, and between said device and said contained data storage and transfer card (DSTC).

4. A personal portable hand held terminal device (XATR) as set forth in claim 3 wherein said control means therein controls all operations performed in said contained data storage and transfer card (DSTC), whereby said external device concurrently connected to said device may not, for any purpose, directly access said data storage and transfer card while located in said device.

5. A personal portable hand held terminal device (XATR) as set forth in claim 4 including radio frequency shielding means in said terminal device (XATR) substantially surrounding said storage and transfer card (DSTC) when located therein to prevent the radiation of said modulated radio frequency signals into the air.

6. A personal portable hand held terminal device (XATR) as set forth in claim 5 including battery means located therein for providing power to operate the circuitry therein and means for converting alternating current which is air coupled into said device for periodically charging said battery.

* * * * *